(12) United States Patent
Heo et al.

(10) Patent No.: US 7,993,775 B2
(45) Date of Patent: Aug. 9, 2011

(54) CONDUCTIVE PLATE AND SECONDARY BATTERY PACK USING CONDUCTIVE PLATE

(75) Inventors: Sangdo Heo, Yongin-si (KR); Woojin Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 12/759,099

(22) Filed: Apr. 13, 2010

(65) Prior Publication Data

US 2010/0196754 A1 Aug. 5, 2010

Related U.S. Application Data

(62) Division of application No. 11/642,866, filed on Dec. 21, 2006.

(30) Foreign Application Priority Data

Dec. 29, 2005 (KR) .................. 10-2005-0134521

(51) Int. Cl.
*H01M 2/24* (2006.01)
*H01M 2/22* (2006.01)
*H01M 6/42* (2006.01)
*H01R 13/62* (2006.01)
*H01R 4/10* (2006.01)

(52) U.S. Cl. ......... 429/158; 429/160; 439/366; 439/775

(58) Field of Classification Search .......... 429/149–160, 429/121; 439/202, 366, 388, 504, 522, 627, 439/726, 754, 755, 382, 510, 775, 862–863
See application file for complete search history.

(56) References Cited

U.S. PATENT DOCUMENTS

| 6,423,441 B1* | 7/2002 | Ronning et al. ................. 429/82 |
| 2005/0031945 A1 | 2/2005 | Morita et al. | |

FOREIGN PATENT DOCUMENTS

| EP | 0607675 A1 | 7/1994 |
| EP | 0928037 A1 | 7/1999 |
| EP | 0962993 A1 | 12/1999 |
| JP | 1024 | 9/1922 |
| JP | 10106533 A * | 4/1998 |
| JP | 2004119043 A | 4/2004 |
| JP | 2004-164981 | 10/2004 |
| JP | 2005-011629 A | 1/2005 |
| JP | 2005-056721 | 3/2005 |
| JP | 2005174707 | 6/2005 |
| JP | 2005-317458 | 11/2005 |
| WO | 9905743 A1 | 2/1999 |

OTHER PUBLICATIONS

Machine translation and Abstract in English of JP 10-106533.*

(Continued)

*Primary Examiner* — Dah-Wei D Yuan
*Assistant Examiner* — Claire L Roe
(74) *Attorney, Agent, or Firm* — Robert E. Bushnell, Esq.

(57) ABSTRACT

A conductive plate connects the electrode terminals between batteries of a battery pack and prevents a change in thickness of the battery pack due to swelling of a battery during charging by forming an expansion unit in a conductive plate electrically connecting batteries of the battery pack in which at least two batteries are stacked.

4 Claims, 5 Drawing Sheets

OTHER PUBLICATIONS

Japanese Office Action dated Feb. 2, 2010 for the corresponding Korean Patent Application No. 10-2005-0134521 and Request for Entry of one accompanying Office Action attached herewith.

Machine Translation and Abstract in English of JP 2005-011629.
Office Action (Paper No. 20100602) mailed on Jun. 14, 2010 for cross-referenced U.S. Appl. No. 11/642,866.

* cited by examiner

CONDUCTIVE PLATE AND SECONDARY BATTERY PACK USING CONDUCTIVE PLATE

CROSS-REFERENCE TO RELATED APPLICATIONS AND CLAIM OF PRIORITY

This application is a divisional of applicant's Ser. No. 11/642,866 entitled CONDUCTIVE PLATE AND SECONDARY BATTERY PACK USING CONDUCTIVE PLATE filed in the U.S. Patent & Trademark Office on 21 Dec. 2006, and assigned to the assignee of the above-caption application. Furthermore, this application makes reference to, incorporates the same herein, and claims all benefits accruing under 35 U.S.C. §119, §120 and §121 from the aforesaid applicant's Ser. No. 11/642,866 and from an application for CONDUCTIVE PLATE AND PACK SECONDARY BATTERY USING IT earlier filed in the Korean Intellectual Property Office on the 29 Dec. 2005 and there duly assigned Serial No. 10-2005-0134521.

BACKGROUND OF THE INVENTION

1. Field of the Invention

The present invention relates to a secondary battery pack, and more particularly, the present invention relates to a conductive plate for preventing the bending of a battery pack due to swelling when charging a battery pack containing at least two batteries and further relates to a secondary battery pack using such a conductive plate.

2. Description of the Related Art

Recently, compact and light-weight electrical and electronic devices, such as cellular phones, notebook computers, camcorders and so on are being developed and manufactured. An electrical battery pack is embedded into these devices so that these portable electrical and electronic devices may be operated even in places where an additional power source is unavailable. The embedded battery pack includes at least two batteries inside of it so that a voltage of a predetermined level may be outputted, thereby driving the portable electrical and electronic devices.

Recently, in light of the economic situations, battery packs employ a secondary battery in which charging and discharging is possible. Such secondary batteries include Nickel-Cadmium batteries (Ni—Cd), Ni-Hydrogen batteries (Ni—MH), Lithium (Li) batteries and Lithium ion batteries.

In most of such secondary batteries, an electrode assembly composed of an anode, a cathode and a separator are contained in a can formed of aluminum or an aluminum alloy, a cap assembly is mounted on the can, the electrolyte is injected into the can, and the can is sealed. The can may be formed of a ferrous metal, but if it is formed of aluminum or an aluminum alloy, the battery can be light-weight, corrosion-proof, and have improved characteristics under high-voltage.

A conventional battery pack described above, and shown in FIG. 1, includes at least two battery cells 1 and 2 arranged in a thickness direction thereof, and electrode terminals 1a and 2a of different polarities which are electrically connected via a conductive plate 3.

However, in the past, as shown in FIG. 2, when each battery is charged to 100%, the center portion thereof is raised due to swelling. Therefore, the end of the battery pack in which the batteries are not connected by the conductive plate is widened more than the end of the battery pack in which the batteries are connected by the conductive plate.

In this way, if the angle θ formed at the end of the battery pack in which the batteries are not connected by the conductive plate becomes large, the entire battery pack is bent into a V shape, and thus there is a problem in that a space larger than the space occupied by the original battery pack is needed. That is, the thickness of the entire battery pack increases.

SUMMARY OF THE INVENTION

Considering this problem, an object of the present invention is to prevent the thickness of an entire battery pack having batteries connected by a conductive plate from being increased by a change of the length of the conductive plate when an external force is applied by forming an expansion unit, whose length is expanded, on the conductive plate which stacks and connects at least two batteries.

In order to accomplish the above object, a conductive plate according to the present invention includes a welding portion which is electrically connected to electrode terminals of at least two batteries and an expansion unit whose length is increased with respect to the welding portion in response to an external force being applied.

A notching unit surrounding the welding portion is formed in the first embodiment of the expansion unit; the expansion unit expands with respect to the notching unit when an external force is applied.

The second embodiment of the expansion unit is formed as a plurality of wrinkled shapes arranged between the welding portions.

The third embodiment of the expansion unit is formed as a connection unit of a zigzag shape having a narrower width than a width of the welding portion.

Furthermore, in order to accomplish the above object, a secondary battery pack in which a conductive plate is employed according to the present invention is a secondary battery pack in which at least two batteries are stacked in a thickness direction, and the electrode terminals of the stacked batteries are connected by a conductive plate, and the conductive plate includes a welding portion connected to the electrode terminals of the batteries and an expansion unit whose length increases with respect to the welding portion in response to an external force being applied.

The secondary battery pack preferably further includes a notching unit surrounding the welding portion arranged in the expansion unit; the expansion unit expands with respect to the notching unit in response to an external force being applied.

The expansion unit preferably includes a plurality of wrinkled shapes arranged in a middle portion of the welding portion. The expansion unit alternatively preferably includes a connection unit of a zigzag shape having a narrower width than a width the welding portion.

In connection with the conductive plate formed as described above and the battery pack to which the conductive plate is applied, an effect is obtained that the thickness of a battery pack is not changed due to a swelling occurring during charging.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments according to the present invention are described below with reference to the accompanying drawings.

Figure 1:
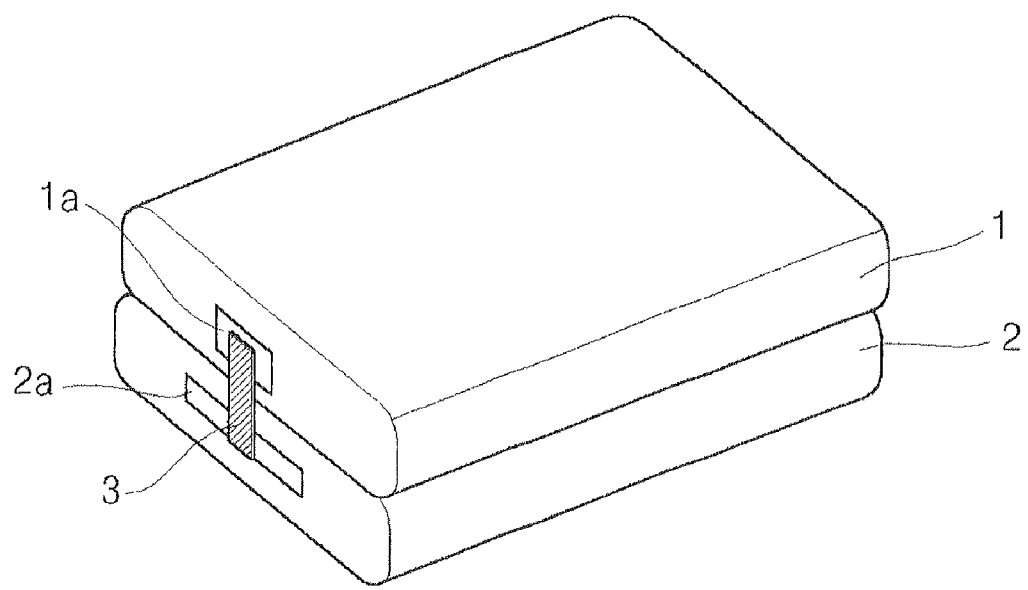
FIG. 1 is a perspective view of batteries of a conventional battery pack stacked in the thickness direction.
Figure 2:
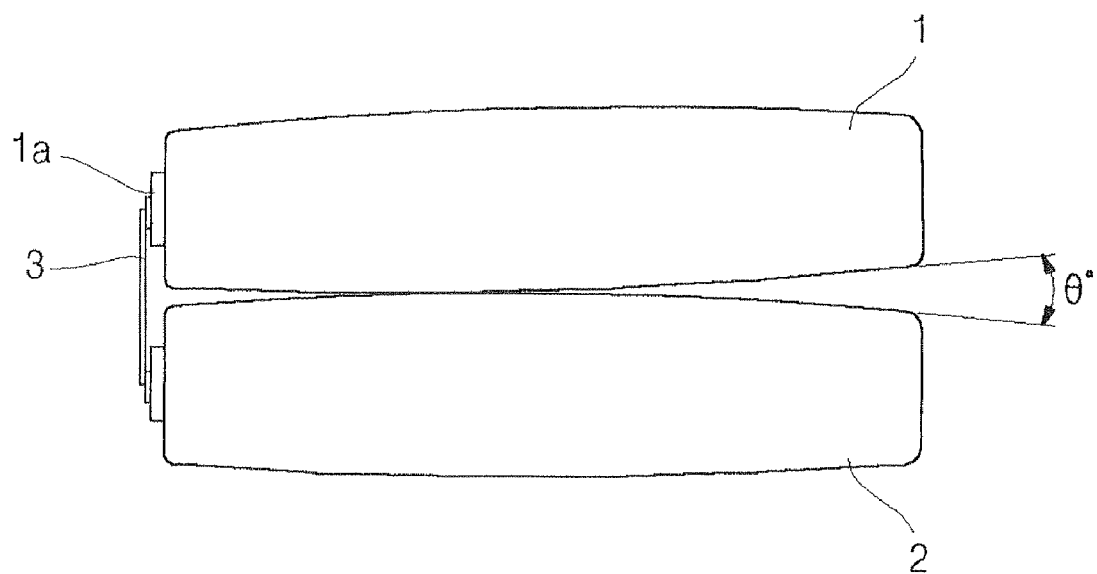
FIG. 2 is a lateral view of bending occurring in conventional battery packs.
Figure 3:
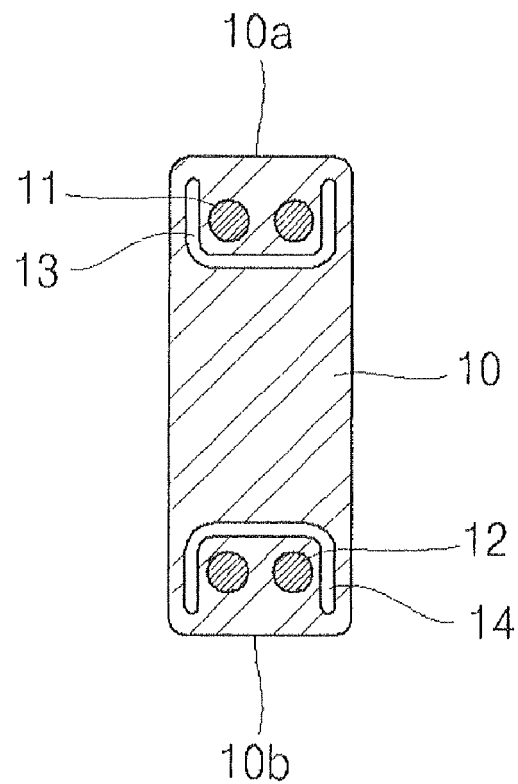
FIG. 3 is a front view of a conductive plate according to the first embodiment of the present invention.

FIG. 3 is a front view of a conductive plate according to the first embodiment of the present invention.

As illustrated in FIG. 3, a conductive plate according to the first embodiment of the present invention includes welding portions 11 and 12 for connecting the electrode terminals of the batteries stacked at the upper side and the lower side to both ends of a body 10 formed as a general square shape, and notching units 13 and 14 arranged along the periphery of the welding portions 11 and 12 for forming expansion units for allowing the length of the conductive plate to be expanded by the concentration of stress when an external force is applied.

The welding portions 11 and 12 are each composed of two spot points, the notching units 13 and 14 are formed by three sides surrounding the spot points, and a notching unit is not formed on one side corresponding to the sides 10a and 10b of the end sides of the conductive plate 10.

The conductive plate 10 may be formed of various kinds of conductive metals, and the conductive plate 10 is preferably formed of a nickel material having a very high electrical conductivity.

Figure 4:
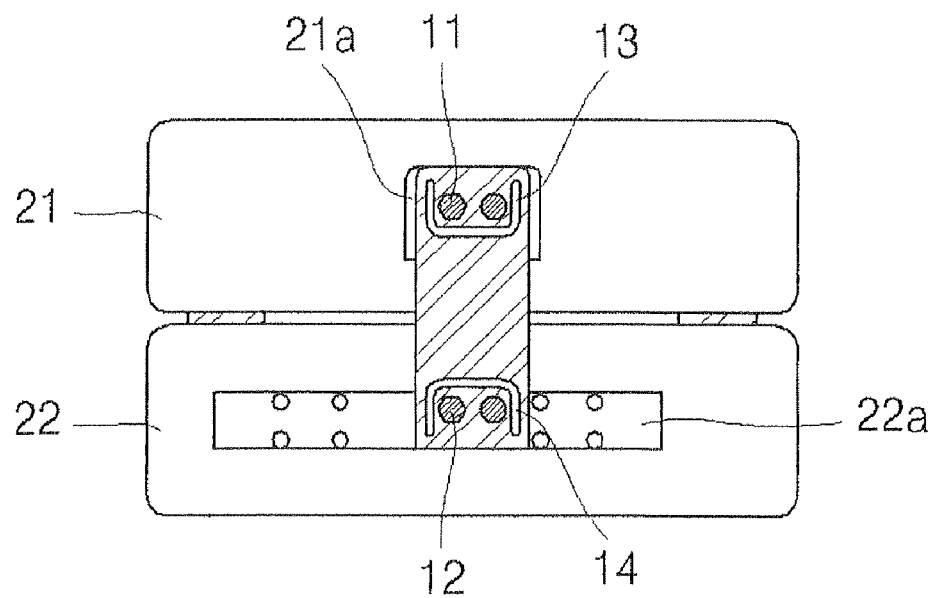
FIG. 4 is a front view of a secondary battery pack to which a conductive plate according to the first embodiment of the present invention is applied.
Figure 5A:
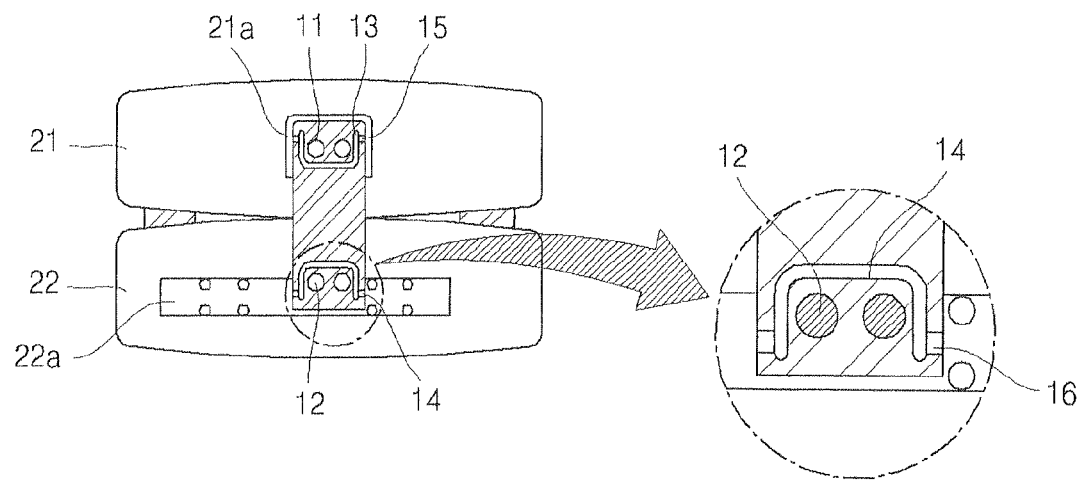
FIG. 5A is a front view of a secondary battery pack of FIG. 4 when swelling occurs.
Figure 5B:
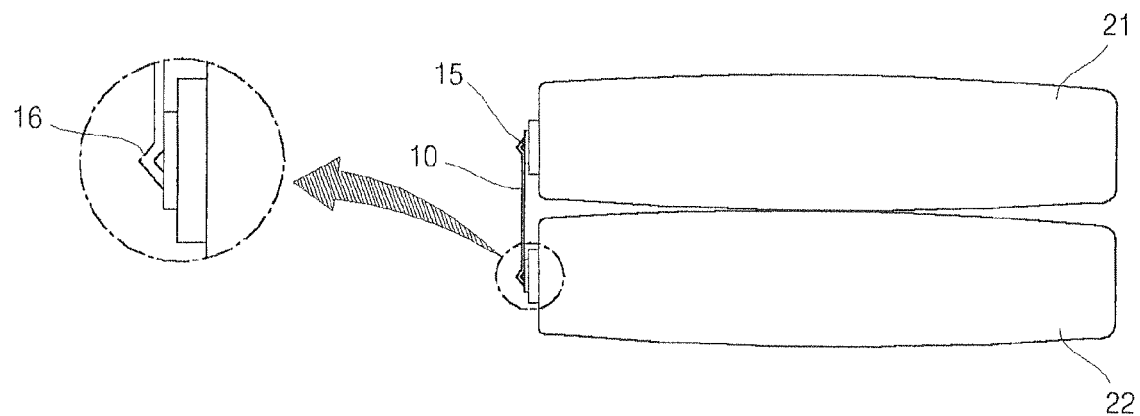
FIG. 5B is a lateral view of FIG. 5A.

An embodiment in which the conductive plate formed as above is applied to a secondary battery pack is illustrated in FIG. 4, and FIG. 5A and FIG. 5B are a front view and a lateral view, respectively depicting the secondary battery pack of FIG. 4 after swelling occurs.

As illustrated in FIG. 4, the battery pack according to the exemplary embodiment of the present invention is a battery pack which two battery cells 21 and 22 are stacked in the thickness direction, and both ends of the conductive plate 10 are welded to the electrode terminals 21a and 22a of different polarities, and thereby electrically connected together; the battery cell 21 and 22 are connected to both ends of the conductive plate 10 via the welding portions 11 and 12.

When the battery cells 21 and 22 are connected to both ends of the conductive plate 10 and each cell is charged 100%, the center portion of the stacked batteries 21 and 22 swells due to the swelling of the battery cells, as shown in FIG. 5A and FIG. 5B. Therefore, a force is generated in a direction away from the electrodes 21a and 22a of both batteries. The stress is concentrated on the conductive plate 10 by the notching units 13 and 14 formed along the peripheries of the welding portions 11 and 12.

To be more specific, since the welding portions 11 and 12 are fixed to the battery cells 21 and 22, the stress is concentrated on both ends of the notching units 13 and 14 of the conductive plate 10, and if a force is applied to the portion where the stress is concentrated, wrinkles occur, the space between the welding portions 11 and 12 where the conductive plate 10 is fixed to the battery cells 21 and 22 including the length of the wrinkles 15 and 16.

In this way, in the battery cells 21 and 22 of a battery pack in which a conductive plate 10 to which the first embodiment of the present invention is applied is employed, the angle of the other end of the battery pack which is not connected by a conductive plate 10 is larger than the angle between the battery cells arranged at the end of the battery pack including batteries connected by a conductive plate 10. As a result, the front end and a back end of the battery cells 21 and 22 stacked in the thickness direction are maintained in a parallel state.

Figure 6:
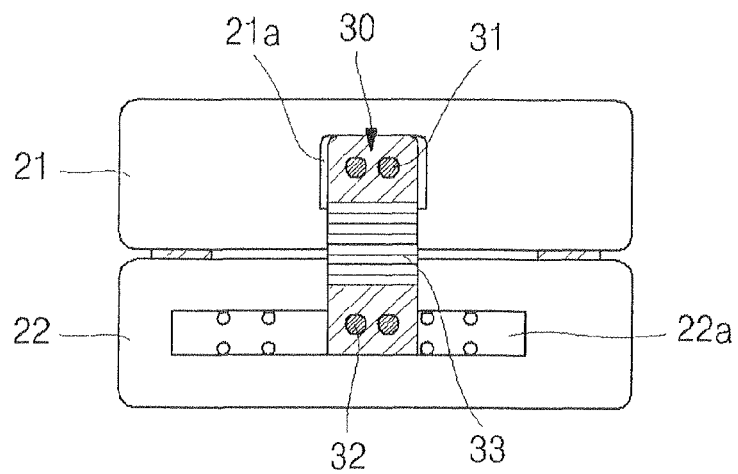
FIG. 6 is a front view of a secondary battery pack to which a conductive plate according to the second embodiment of the present invention is applied.

FIG. 6 is a front view of a pack secondary battery to which a conductive plate according to the second embodiment of the present invention is applied.

As illustrated in FIG. 6, a conductive plate 30 according to the second embodiment of the present invention is composed of an expansion unit formed as a plurality of wrinkled shapes 33 between the welding portions 31 and 32 formed at both ends of the conductive plate 30. In this way, since a plurality of wrinkled shapes 33 is formed in the conductive plate 30, when an external force is generated, the length of the entire conductive plate 30 can be changed.

Figure 7:
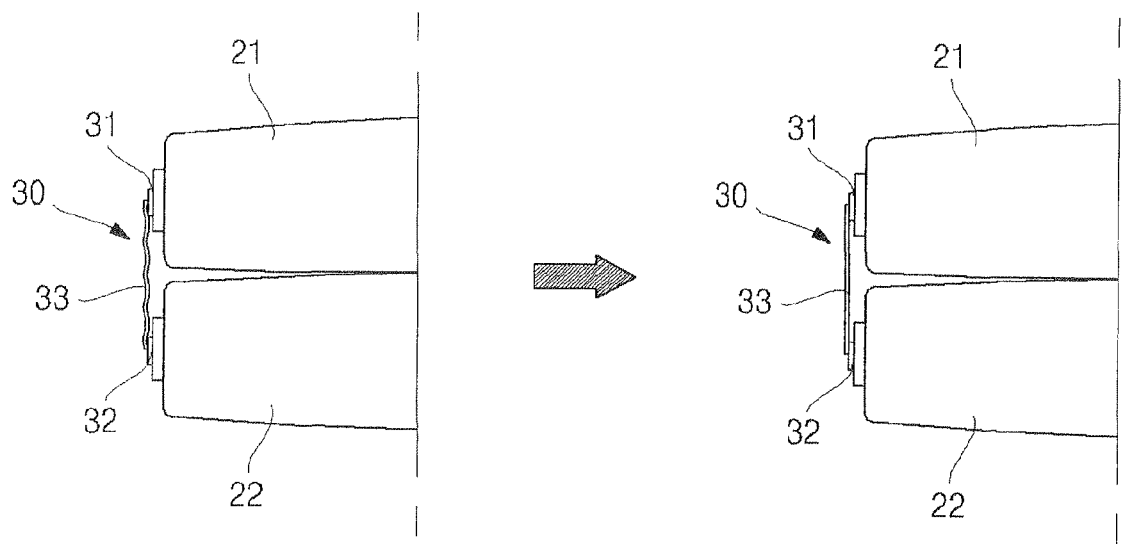
FIG. 7 is a partial lateral view of a secondary battery pack before and after swelling occurs in the secondary battery pack of FIG. 6.

In the battery pack to which the conductive plate 30 according to the second embodiment of the present invention is applied, as illustrated in FIG. 7, when the battery pack is charged 100%, a force is applied to the welding portions 31 and 32 of the conductive plate 10 in the reverse direction due to swelling of the battery cells 21 and 22, and the zigzagging portions of the wrinkles 33 are expanded. Accordingly, the entire length of the conductive plate 10 is increased and the stacked upper and lower cells 21 and 22 are maintained in parallel, and the thickness of the entire battery pack is not changed.

Figure 8:
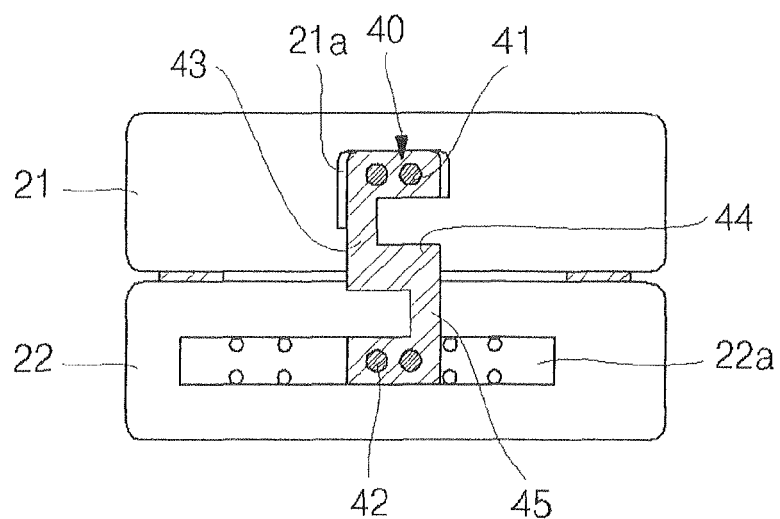
FIG. 8 is a front view of a secondary battery pack to which a conductive plate according to the third embodiment of the present invention is applied.

FIG. 8 is a front view of a pack secondary battery to which a conductive plate according to the third embodiment of the present invention is applied.

As illustrated in FIG. 8, the conductive plate 40 according to the third embodiment of the present invention is composed of an expansion unit formed at both ends thereof as a connection unit of a zigzag shape between the welding portions. As shown in FIG. 8, the expansion unit is composed of a vertical unit 43, a bent horizon unit 44 vertically bent at one end of the vertical unit 43, and a vertical unit 45 vertically bent once again at one end of the horizon unit 44 rather than a complete zigzag type. However, the present invention is not limited to this shape. The conductive plate 40 according to the third embodiment of the present invention has a connection unit which is similar to a zigzag type that can be expanded in the length direction of the conductive plate 40.

Figure 9:
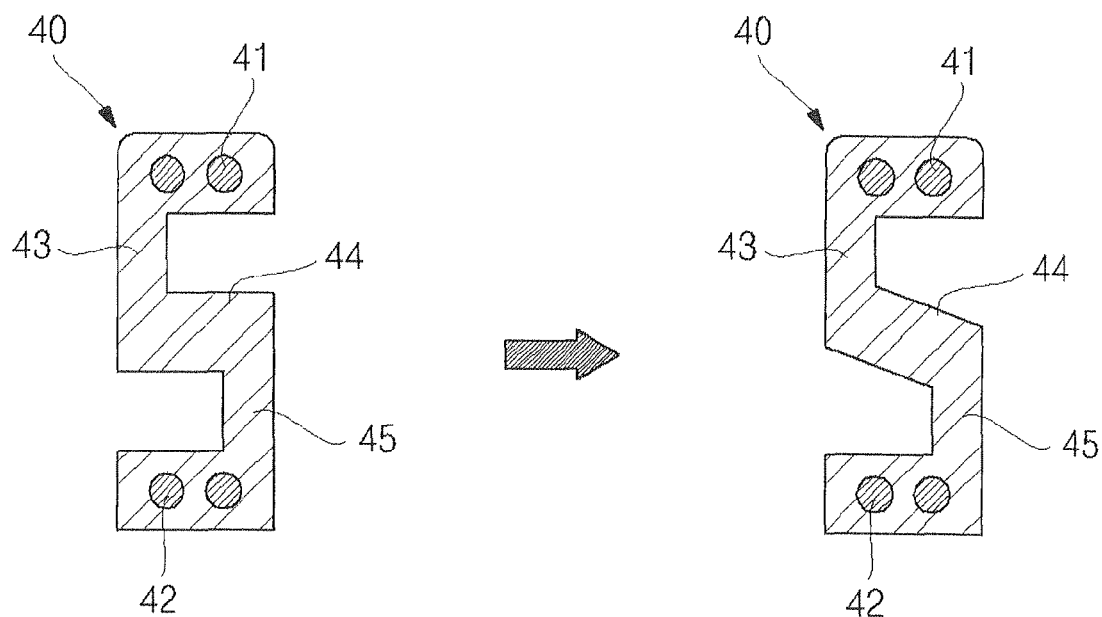
FIG. 9 is a front view of a conductive battery pack plate before and after swelling occurs in the secondary battery pack of FIG. 8.

In the battery pack to which the conductive plate 40 according to the third embodiment of the present invention formed as above is applied, as illustrated in FIG. 9, when the battery cells 21 and 22 swell, a force is generated in the opposite direction of the welding portions 41 and 42 of the conductive plate 40. Each shape of a vertical unit 43, a horizon unit 44 and a vertical unit 45 is changed and the length of the conductive plate 40 is increased. Therefore, the upper battery cell 21 and the lower battery cell 22 stacked in the thickness direction are maintained in parallel, and the thickness of the battery pack is not changed.

As explained above, according to the present invention, since two or more batteries are stacked, connected and fixed via a conductive plate, the bending of a battery pack does not occur due to the swelling of a battery, and thus, a change in the thickness of the battery pack can be prevented.

As described above, the exemplary embodiments of the present invention have been disclosed through the descriptions and the drawings. The terms are used not to define the meanings thereof or restrict the scope of the present invention recited in the claims but to explain the present invention. Therefore, as appreciated by those skilled in the art, modifications can be made to these embodiments without departing from the principles and spirit of the present invention, the scope of which being defined by the following claims.

What is claimed is:

1. A conductive plate assembly to connect at least two batteries, the conductive plate comprising:
   a plurality of welding portions electrically connected to corresponding ones of the electrode terminals of the at least two batteries, each welding portion including at least two spot points respectively arranged at each of two ends of the welding portion; and
   an expansion unit positioned between the welding portions and having a length along a lengthwise direction of the conductive plate assembly, the length of the expansion unit being configured to increase with respect to the welding portions in response to application of an external force applied to the conductive plate assembly, the expansion unit including a connection unit formed by a plate having a serpentine shape along the lengthwise direction, the connection unit having a narrower width as measured transversely to said lengthwise direction, than a width of the conductive plate as measured transversely to said lengthwise direction.

2. A secondary battery pack comprising:
   at least two batteries stacked in a thickness direction, electrode terminals of the stacked batteries being electrically connected by a conductive plate;
   the conductive plate comprising a plurality of welding portions electrically connected to corresponding ones of the electrode terminals of the at least two batteries, the welding portions including at least two spot points respectively arranged at each end of the welding portion; and
   an expansion unit positioned between the welding portions and having a length along a lengthwise direction of the conductive plate assembly, the length of the expansion unit being configured to increase with respect to the welding, portions in response to application of an external force applied to the conductive plate assembly, the expansion unit including a connection unit formed by a plate having a serpentine shape along the lengthwise direction, the connection unit having a narrower width as measured transversely to said lengthwise direction, than a width of the conductive plate as measured transversely to said lengthwise direction.

3. The conductive plate assembly of claim 1, wherein the connection unit is bent in a direction parallel with a plane defined by a major surface of the connection unit to form the serpentine shape.

4. The conductive plate assembly of claim 2, wherein the connection unit is bent in a direction parallel with a plane defined by a major surface of the connection unit to form the serpentine shape.

* * * * *